United States Patent [19]

Ogawa et al.

[11] Patent Number: 5,035,833

[45] Date of Patent: Jul. 30, 1991

[54] BLOWING AGENT COMPOSITION FOR PREPARING A RIGID POLYURETHANE FOAM

[75] Inventors: Motosuke Ogawa; Hiromitsu Fukazawa; Yasumasa Ogawa, all of Shimizu, Japan

[73] Assignee: Du Pont-Mitsui Fluorochemicals Co., Ltd., Tokyo, Japan

[21] Appl. No.: 436,140

[22] Filed: Nov. 16, 1989

Related U.S. Application Data

[62] Division of Ser. No. 257,535, Oct. 14, 1988, abandoned.

[30] Foreign Application Priority Data

Oct. 16, 1987 [JP] Japan ................................ 62-259666

[51] Int. Cl.$^5$ ................................................. C09K 3/00
[52] U.S. Cl. ........................... 252/182.24; 252/182.25; 252/305; 252/350; 264/DIG. 5; 521/98
[58] Field of Search ................. 252/182.24, 182.25, 252/305, 350; 264/DIG. 5

[56] References Cited

U.S. PATENT DOCUMENTS

| | | | |
|---|---|---|---|
| 4,042,658 | 8/1977 | Collins | 264/DIG. 5 |
| 4,226,946 | 10/1980 | Park et al. | 521/98 |
| 4,279,664 | 7/1981 | Figiel et al. | 252/DIG. 9 |
| 4,407,982 | 10/1983 | Elgie | 521/122 |
| 4,624,970 | 11/1986 | Dwyer et al. | 521/131 |
| 4,642,319 | 2/1987 | McDaniel | 252/182.24 X |
| 4,655,956 | 4/1987 | Basu et al. | 252/DIG. 9 |
| 4,687,787 | 8/1987 | Zwolinski et al. | 521/98 |
| 4,689,170 | 8/1987 | Zyhowski | 252/DIG. 9 |
| 4,713,400 | 12/1987 | Zwolinski et al. | 521/98 |
| 4,795,763 | 1/1989 | Gluck et al. | 521/99 |

Primary Examiner—Richard D. Lovering
Attorney, Agent, or Firm—Sherman and Shalloway

[57] ABSTRACT

A blowing agent composition for use in preparing a polyurethane foam, which is a mixture of dichlorotrifluoroethane and at least one of paraffins having 5 and 6 carbon atoms in a weight ratio of from 97:3 to 70:30.

2 Claims, No Drawings

BLOWING AGENT COMPOSITION FOR PREPARING A RIGID POLYURETHANE FOAM

This application is a division of application Ser. No. 07/257,535 filed Oct. 14, 1988 now abandoned.

Polyurethane foams have been produced by reacting polyols and polyisocyanates using chlorofluoroalkanes as a blowing agent. For convenience of handling, it is the usual practice in the factories to prepare a large amount of a mixture of a polyol and a blowing agent and store it as a "premix".

However, during storage, the chlorofluoroalkane blowing agent conventionally used reacts partly with a primary and secondary polyol to form hydrogen chloride, an aldehyde, a ketone and other reaction products. These reaction products from the chlorofluoroalkane and the polyol adversely affect the properties of a polyurethane foam to be produced by using this premix. To inhibit this reaction between the blowing agent and the polyurethane precursor, it is effective to incorporate such a compound as alpha-methylstyrene, alloocimene and nitromethane as a stabilizer into the premix. Polyurethane foams prepared by using such a premix often have an unpleasant smell lasting for a long period of time.

To remedy this defect, it was proposed to use 1,1-dichloro-2,2,2-trifluoroethane (Flon-123) as the blowing agent (Japanese Laid-Open Patent Publication No. 85298/1977). It is noteworthy that Flon-123 has incomparable higher compatibility with the polyol than trichlorofluoromethane (Flon-11) which has generally been used as the blowing agent. However, a polyurethane foam obtained by using Flon-123 as the blowing agent has a higher density than that obtained by using Flon-11. To eliminate this defect, the amount of Flon-123 used should be increased by at least 10% by weight from that of Flon 11. To use such a large amount of Flon-123 is not only uneconomical but degrades the thermal insulating properties of the polyurethane foam. The thermal insulating properties are most important in polyurethane foams for use in electric refrigerators.

A method has also been known to use a mixture of Flon-123 and Flon-11 as the blowing agent (Japanese Laid-Open Patent Publication No. 18418/1987). According to this method, the compatibility of the blowing agent mixture with the polyol increases, but to maintain the properties of the resulting foam at a level equivalent to those of a foam obtained by foaming with Flon-11 alone, Flon-11 must be used in a predominant proportion of at least 60% by weight. Accordingly, there is a tendency that the useful properties of Flon-123 cannot be sufficiently utilized. The compatiblity of this blowing agent mixture is improved over that of Flon-11 alone but is much lower than that of Flon-123 alone. Furthermore, since the amount of Flon-11 is relatively large, it is often necessary to add various stabilizers such as alphamethylstyrene, alloocimene and nitromethane.

It is an object of this invention to provide a mixed blowing agent composition which can eliminate the defect of Flon-123 without impairing its valuable properties.

According to this invention, this object is achieved by a blowing agent composition for use in preparing a polyurethane foam, which is a mixture of dichlorotrifluoroethane (Flon-123) and at least one of paraffins having 5 and 6 carbon atoms such as n-pentane or n-hexane in a weight ratio of from 97:3 to 70:30.

The blowing agent composition of this invention imparts useful properties, especially density characteristics, to rigid polyurethane foams. A foam obtained by foaming with Flon-123 has a higher density than a foam obtained by foaming with Flon-11. The blowing agent composition of the invention makes it possible to prepare a foam having a lower density than the foam obtained with Flon-11, and it does not require the aforesaid stabilizers used with Flon-11. Furthermore, a premix having excellent storage stability can be prepared by using the composition of the invention.

The blowing agent composition of the invention substantially retain the excellent compatibility of Flon-123. Generally, the premix is prepared by adding 35 to 50 parts by weight of Flon-11 to 100 parts of the polyol. Because a hydrophilic polyol, particularly a hydrous polyol, has poor compatibility with Flon-11, and the mixture is emulsified, or the components separate from each other. Even if they dissolve, the resulting premix is frequently unstable. If the composition of the invention is used instead of Flon-11 in this case, a stable premix can be prepared.

Thus, with the blowing agent composition of this invention, the excellent solubility is maintained by Flon-123 as one component, and the defect which occurs in the case of using Flon-123 alone is eliminated or reduced by the paraffin or the other component. Consequently, the composition can suppress the degradation of the properties of the resulting foam. This is a dual effect arising from the addition of the paraffin to Flon-123.

The following Examples illustrate the present invention specifically.

EXAMPLE 1

| Ingredient | Parts by weight |
| --- | --- |
| Polyol (PPC-NT-470, a product of Mitsui Toatsu Chemicals, Inc.) | 100 |
| H$_2$O | 2.0 |
| Catalyst (TMND, a product of Katsuzai Chemical Co.) | 1.6 |
| Silicone (SH-198, a product of Toray Inc.) | 2.0 |
| Blowing agent (*) | 40 |

(*) When the blowing agent was Flon-11, its amount was 40 parts by weight. In the case of the mixed blowing agent (Flon-123 + n-pentane), its amount was equimolar to the amount of Flon-11.

equimolar to the amount of Flon-11.

A premix of the above formulation (about 125 g) was taken into an aerosol can (AE No. 180, tin plate can) and stored at 60° C. for a period of 10 days, 20 days and 30 days. Samples after storage and a sample before storage were evaluated. The acid value was measured by using a mixture of Bromothymol Blue and Phenol Red as an indicator and titrating the samples with a 1/10 N ethanol solution of potassium hydroxide. The results are shown in Table 1.

TABLE 1

| | Acid value of the premix (mg KOH/g) | | | |
| --- | --- | --- | --- | --- |
| Blowing agent | Immediately after preparation | 10 days later | 20 days later | 30 days later |
| Flon-11 | 0.06 | 0.85 | 1.98 | 2.88 |
| Flon-11 + alpha-methylstyrene | 0.05 | 0.20 | 0.31 | 0.40 |
| Flon-123 | 0.07 | 0.18 | 0.28 | 0.39 |
| Flon-123 + n-pentane | 0.06 | 0.19 | 0.28 | 0.36 |

TABLE 1-continued

| Blowing agent | Acid value of the premix (mg KOH/g) | | | |
|---|---|---|---|---|
| | Immediately after preparation | 10 days later | 20 days later | 30 days later |
| (90/10) Flon-123 + n-pentane | 0.07 | 0.22 | 0.29 | 0.38 |
| (80/20) Flon-123 + n-pentane | 0.07 | 0.19 | 0.27 | 0.34 |
| (70/30) | | | | |

The premixes obtained by using the mixed blowing agent of the invention had higher stability than the premix obtained by using Flon-11 as a sole blowing agent and were equivalent to the premix obtained by using Flon-11 with the stabilizer.

EXAMPLE 2

Test for compatibility between Flon and polyol.

The compatibility test is to determine whether the premix can be stored as a solution without separation into the polyol and Flon. The specific test procedure was as follows:

A polyol and Flon were taken into a 150 ml cylindrical glass bottle so that the ratio between them was 75/25, 70/30, 65/35/ 60/40, 55/45, or 50/50 (by weight and the total amount was about 60 to 80% of the volume of the glass bottle. The compounds were mixed for 5 minutes by using a shaking device (Iwaki KF shaker) and left to stand at room temperature (about 23° C.) for 1 hour, and then the mixed condition was observed.

When the polyol and Flon completely dissolved in each other, a clear one-layer mixture was obtained. When they were not dissolved in each other, the mixture separated into 2 or 3 layers. In this case, the lower layer was a colorless clear brown Flon layer and the upper layer was a clear brown layer composed mainly of the polyol. In the case of the three layers, the interlayer was an emulsion of the polyol and Flon. Since the mixing ratio of the polyol to Flon in premixes actually used is in the range of from 70/30 to 65/35, the following standards of evaluation were used.

Excellent: dissolved at a mixing ratio of 55/45
Good: dissolved at a mixing ratio of 60/40
Fair: dissolved at a mixing ratio of 65/35
Poor dissolved or separated at a mixing ratio of 70/30

A premix evaluated as "good" shows compatibility in an actually used mixing ratio range and can be normally used. It is however likely to separate at low temperatures, for example in the wintertime. It is difficult therefore to use it as a standard recipe.

Run 1

PPG-NT-470 (to be referred to as polyol A) as an example of an amine-type polyol, PPG-SUI-460 (to be referred to as polyol B) as an example of a sugar-type polyol and PPG-LV-450LKA (to be referred to as polyol C) as an example of a sugar-type hydrophilic polyol (all of these compounds were products of Mitsui Toatsu Chemicals, Inc.) were each selected and mixed with Flon-11. The compatibility test was carried out on the mixture. Polyols A and B dissolved in any of the ratios, and evaluated as good. But polyol C had poor compatiblity with Flon-11. It dissolved at a ratio of 75/25, but the other samples having a low polyol content separated into three layers. The results are shown in Table 2.

Run 2

The same compatibility test as in Run 1 was carried out except that a mixture of Flon-123 and n-pentane was used instead of Flon-11 in Run No. 1. The mixing ratio of Flon-123 to n-pentane was 95/5, 90/10 and 70/30. The compatibility of Flon-123 with the polyol was higher as the proportion Flon-123 became higher. The results are shown in Table 2.

Run 3

To polyol A and polyol B, 5 % by weight of water was added to prepare hydrous polyols. The hydrous polyol/ Flon-11 premix was tested for compatibility between the hydrous polyol and Flon-11. The compatibility decreased in all cases. The results are shown in Table 2.

Run 4

The compatibility test was carried out by using a mixture composed of the hydrous polyol, Flon-123 and n-pentane in Run 3. As the proportion of Flon-123 in the mixture became higher, the compatibility of the blowing agent mixture with the hydrous polyol was higher. The results are shown in Table 2.

TABLE 2

| Run No. | Polyol | Blowing agent | Polyol/blowing agent mixing weight ratio | | | | | | Evaluation |
|---|---|---|---|---|---|---|---|---|---|
| | | | 75/25 | 70/30 | 65/35 | 60/40 | 55/45 | 50/50 | |
| 1 (Comparison) | A | Flon-11 | S | S | S | S | S | S | Excellent |
| | B | " | S | S | S | S | S | S | Excellent |
| | C | " | S | I | I | I | I | I | Poor |
| 2 | C | Flon-123/n-pentane (95/5) | S | S | S | S | S | S | Excellent |
| | " | Flon-123/n-pentane (90/10) | S | S | S | S | S | S | Excellent |
| | " | Flon-123/n-pentane (80/20) | S | S | S | S | S | S | Excellent |
| | " | Flon-123/n-pentane (70/30) | S | S | S | S | S | I | Good |
| 3 (Comparison) | Hydrous A | Flon-11 | S | S | S | I | I | I | Fair |
| | Hydrous B | " | S | S | I | I | I | I | Poor |
| 4 | Hydrous A | Flon-123/n-pentane (95/5) | S | S | S | S | S | S | Excellent |
| | " | Flon-123/n-pentane (90/10) | S | S | S | S | S | S | Excellent |
| | " | Flon-123/n-pentane (80/20) | S | S | S | S | S | S | Excellent |
| | " | Flon-123/n-pentane (70/30) | S | S | S | S | S | I | Excellent |

TABLE 2-continued

| Run No. | Polyol | Blowing agent | Polyol/blowing agent mixing weight ratio | | | | | | Evaluation |
|---|---|---|---|---|---|---|---|---|---|
| | | | 75/25 | 70/30 | 65/35 | 60/40 | 55/45 | 50/50 | |
| | Hydrous B | Flon-123/n-pentane (95/5) | S | S | S | S | S | S | Excellent |
| | " | Flon-123/n-pentane (90/10) | S | S | S | S | S | S | Excellent |
| | " | Flon-123/n-pentane (80/20) | S | S | S | S | S | S | Excellent |
| | " | Flon-123/n-pentane (70/30) | S | S | S | S | S | I | Excellent |

(*): S means dissolution, and I means separation.

EXAMPLE 3

Foaming test and test for the properties of a foam:

Polyols, a catalyst, a silicone, a blowing agent and water were weighed as described in the following formulation, taken into a 500 ml plastic container (polyethylene cup) and stirred at a low speed by a fourblade labo-mixer to form a premix. Then, 128 parts by weight of an isocyanate was poured into the container and the mixture was immediately stirred at a high speed (for 5 seconds at about 2000 rpm). The mixture was quickly poured into a panel (an aluminum mold having a size of 400×35×600 mm) lined with kraft paper; surface temperature 40° C.), and foamed.

| Ingredient | Parts by weight |
|---|---|
| Polyol (PPC-NT-400, a product of Mitsui Toatsu Chemicals, Inc.) | 50 |
| Polyol (PPC-NT-470, a product of Mitsui Toatsu Chemicals, Inc.) | 50 |
| H$_2$O | 1 |
| Silicone (SH-193, a product of Toray Inc.) | 2 |
| Catalyst (TNHB, a product of Katsuzai Chemical Co.) | 1.8 |
| Blowing agent (*) | 40 |

(*) When the blowing agent was Flon-11, its amount was 40 parts by weight. In the case of the mixed blowing agent (Flon-123 + n-pentane), its amount was equimolar to the amount of Flon-11.

The state of foaming was visually observed using the various blowing agents. The rise time (R.T.) which elapsed until the end of the rising of the foam and the tack-free time (T.F.T.) which elapsed until the upper part of the foam during foaming did not show tackiness when it was lightly touched by a polytetrafluoroethylene rod were measured. The density, the ratio of closed cells formed and the compression strength of each of the resulting foams were measured, and the results are shown in Table 3.

TABLE 3

| Blowing agent | Foaming speed (minute', second") | | Density [kg/m$^3$] | Closed cells [%] | Compression Strength [kg/cm$^2$] |
|---|---|---|---|---|---|
| | R. T. | T. F. T | | | |
| Flon-11 | 2'02" | 1'16" | 32.7 | 89 | 0.80 |
| Flon-123 | 2'16" | 1'25" | 35.8 | 83 | 0.71 |
| Flon-123/n-pentane (95/5) | 2'14" | 1'24" | 33.9 | 86 | 0.73 |
| Flon-123/n-pentane (90/10) | 2'11" | 1'20" | 33.6 | 88 | 0.78 |
| Flon-123/n-pentane (80/20) | 2'06" | 1'18" | 32.6 | 89 | 0.78 |
| Flon-123/n-pentane (70/30) | 2'03" | 1'16" | 31.8 | 89 | 0.79 |

When n-pentane was mixed in a large amount, the state of foaming at the time of using the mixed blowing agent was such that the foaming speed (H.T. and T.F.T.) was improved as compared with the use of Flon-11. As the amount of n-pentane added increased, the density decreased, the ratio of closed cells increased, and the compression strength increased.

We claim:

1. A stabilized pre-mix composition comprising for use in preparing a polyurethane foam, said composition 50 to 75 parts by weight of polyol and 50 to 25 parts by weight of a foaming agent which is a mixture of 1,1-dichloro-2,2,2,-trifluoroethane and n-hexane in a weight ratio of from 97:3 to 70:30.

2. The composition of claim 1, wherein the ratio of polyol to the foaming agent is in the range of from about 70:30 to about 65:35.

* * * * *